United States Patent
Patelczyk

(10) Patent No.: US 6,539,604 B2
(45) Date of Patent: Apr. 1, 2003

(54) VEHICLE STRUCTURE WITH INTEGRAL NODE

(75) Inventor: Jeffrey S. Patelczyk, Woodhaven, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/873,515

(22) Filed: Jun. 4, 2001

(65) Prior Publication Data

US 2001/0042986 A1 Nov. 22, 2001

Related U.S. Application Data

(62) Division of application No. 09/572,548, filed on May 17, 2000, now Pat. No. 6,241,310.

(51) Int. Cl.[7] .................................. B23P 17/00
(52) U.S. Cl. ................. 29/421.1; 29/897.2; 29/897.3; 29/525.06
(58) Field of Search .............. 29/897.2, 897, 29/897.3, 897.312, 421.1, 428, 525.06, 522.1, 523, 897.31, 890.14, 890.141, 890.144, 890.147, 890.148, 890.149; 72/58, 61, 62, 60; 296/205, 203.01, 203.02, 203.03, 29

(56) References Cited

U.S. PATENT DOCUMENTS

| | | | |
|---|---|---|---|
| 2,149,844 A | * | 3/1939 | George .................. 296/29 |
| 4,051,704 A | * | 10/1977 | Kimura .................. 72/58 |
| 4,355,844 A | | 10/1982 | Muzzarelli |
| 4,552,400 A | | 11/1985 | Harasaki et al. |
| 4,988,230 A | * | 1/1991 | Banthia et al. |
| 5,269,585 A | | 12/1993 | Klages et al. |
| 5,320,403 A | * | 6/1994 | Kazyak |
| 5,458,393 A | | 10/1995 | Benedyk |
| 5,673,470 A | * | 10/1997 | Dehlinger et al. |
| 5,794,398 A | * | 8/1998 | Kaehler et al. |
| 5,829,219 A | * | 11/1998 | Sugawara et al. |
| 5,839,777 A | * | 11/1998 | Vlahovic |
| 5,848,853 A | | 12/1998 | Clenet |
| 5,944,377 A | | 8/1999 | Vlahovic |
| 6,010,182 A | | 1/2000 | Townsend |
| 6,126,232 A | | 10/2000 | Nakamo |
| 6,148,581 A | * | 11/2000 | Separautzki |
| 6,302,478 B1 | * | 10/2001 | Jaekel et al. |

* cited by examiner

Primary Examiner—Gregory Vidovich
Assistant Examiner—T. Nguyen
(74) Attorney, Agent, or Firm—Harness, Dickey & Pierce, P.L.C.

(57) ABSTRACT

A fluid formed node is provided to connect structure in an automotive vehicle. Another aspect of the present invention includes a method of forming a structural interconnection including the steps of placing a first member, having an internal cavity in a die pressurizing the internal cavity to form a node integral with and protruding from the first member, disposing the node within an aperture of a second member, and coupling the second member to the node.

8 Claims, 5 Drawing Sheets

VEHICLE STRUCTURE WITH INTEGRAL NODE

BACKGROUND AND SUMMARY OF THE INVENTION

The present invention pertains generally to structural members and, more particularly, to a vehicle structure having an integral node.

In the field of motor vehicle design, it is highly desirable to construct a modular vehicle including a subframe adaptable for use with a variety of aesthetically pleasing outer panels. Additionally, the use of extruded tubular sections within the construct of the subframe greatly enhances the strength and durability of the frame without drastically increasing the weight and cost.

Unfortunately, many manufacturers have had difficulty reliably interconnecting individual tubular frame components to form a dimensionally correct and structurally robust vehicle frame. Accordingly, some manufacturers have implemented separate connectors, called nodes, to facilitate the joining process. The separate nodes are typically aluminum alloy castings having a plurality of apertures for receipt of tubular frame components. Due to the relative difficulty of welding aluminum alloys, cast nodes are especially prevalent in joints structurally interconnecting stamped or extruded aluminum components. As would be expected, the use of separate nodes is both costly and time consuming. Therefore, a need in the relevant art exists for an apparatus and method for interconnecting structural members.

Accordingly, it is an object of the present invention to provide an improved vehicle body construction exhibiting the advantages of a tubular construction without the need for separate connectors such as cast nodes.

It is another object of the present invention to provide a structural component including an integrally hydroformed node for use in a vehicle structure having improved strength and dimensional accuracy.

In accordance with the present invention, a fluid formed node is provided to connect structure in an automotive vehicle. Another aspect of the present invention includes a method of forming a structural interconnection including the steps of placing a first member, having an internal cavity in a die, pressurizing the internal cavity to form a node integral with and protruding from the first member, disposing the node within an aperture of a second member, and coupling the second member to the node.

The node of the present invention is advantageous over conventional construction in that the present invention provides an integrally formed attachment location economically created through the use of hydroforming. Additionally, structures incorporating the node of the present invention exhibit superior dimensional stability and structural integrity as compared to the structures previously described. Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION OF THE PREFERRED EMBODIMENT

The following detailed description of the preferred embodiment is merely exemplary in nature and is no way intended to limit the invention, its application, or uses. For example, the apparatus and techniques disclosed herein may have utility in forming a wide variety of different structures including boats, bicycles, aircraft and railroad structures.

Figure 1:
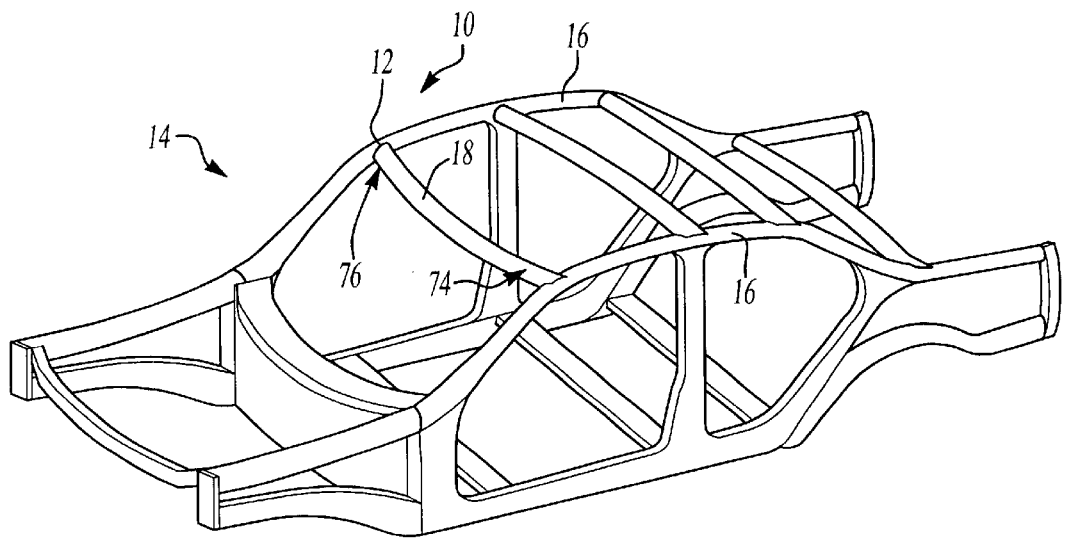
FIG. 1 is a perspective view of an automotive vehicle skeletal structure showing the preferred embodiment of a node of the present invention.
Figure 2:
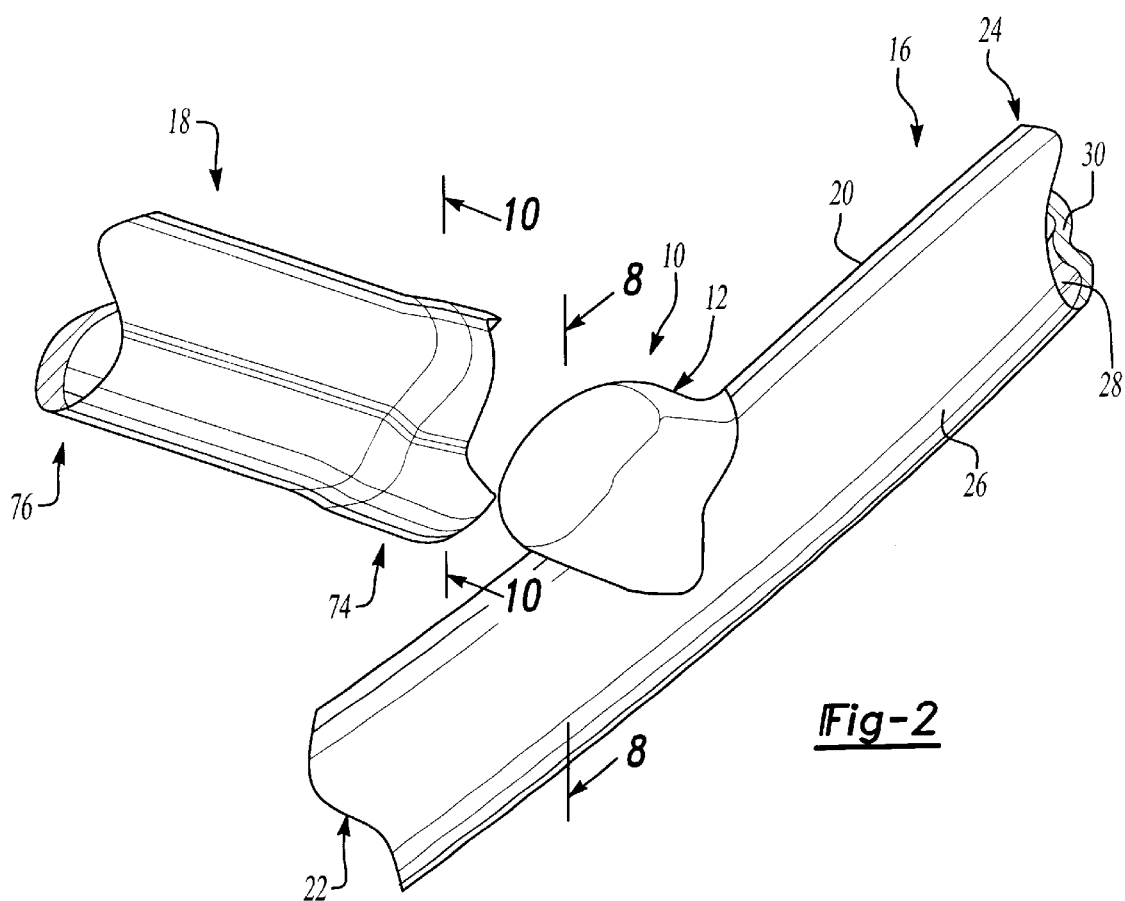
FIG. 2 is a fragmentary, exploded perspective view showing the preferred embodiment node.

Referring to FIGS. 1 and 2, an exemplary structural interconnection 10 includes a hydroformed node 12 constructed in accordance with the teachings of the preferred embodiment of the present invention. Hydroformed node 12 is shown operatively associated with an exemplary vehicle frame 14. It should be appreciated that one or more of the interconnections within vehicle frame 14 may include a hydroformed node such as node 12 and the specific interconnection discussed hereinafter is an example thereof.

Vehicle frame 14 includes a pair of side rail panel panels 16 extending substantially parallel to a longitudinal or fore-and-aft axis of the vehicle. A header panel 18 transversely spans vehicle frame 14 and interconnects each of the side rail panel panels 16. Each of the panels 16 and 18 are preferably constructed from an aluminum alloy exhibiting high strength per unit weight.

With specific reference to FIG. 2, side rail panel 16 is preferably a generally hollow tubular shaped extrusion 20 having a first open end 22, a second open end 24 with at least one of nodes 12 positioned therebetween. Side rail panel 16 also includes an outer surface 26 and an inner surface 28 defining a wall 30. The cross sectional shape of the side rail panel 16 may be alternately constructed to suit a variety of different design applications. It is feasible to implement an extrusion having a first wall thickness for an application requiring moderate structural properties while another extrusion, having the same outer surface configuration as the first, may be formed to include a greater wall thickness and correspondingly superior structural properties. In this manner, it is possible to implement the lighter weight extrusion having a thinner wall in an otherwise rigidly framed vehicle such as a coupe while the second stiffer member is more suitable for a convertible automobile application. By maintaining a common outer surface profile, a single hydroforming die can create both coupe and convertible structural components as will be described hereinafter.

Figure 3:
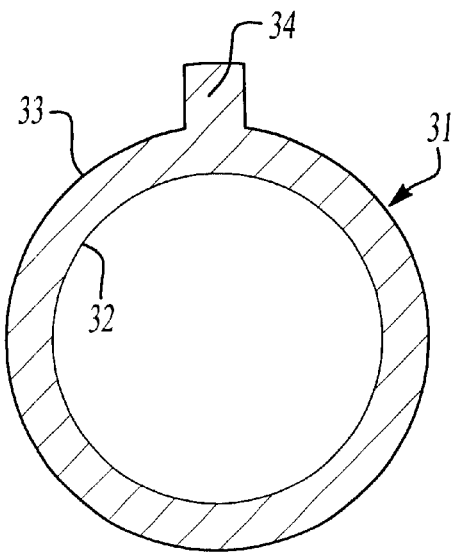
FIG. 3 is a cross-sectional view showing a first embodiment of an extruded tubular member having an integral flange employed with the preferred embodiment node.
Figure 4:
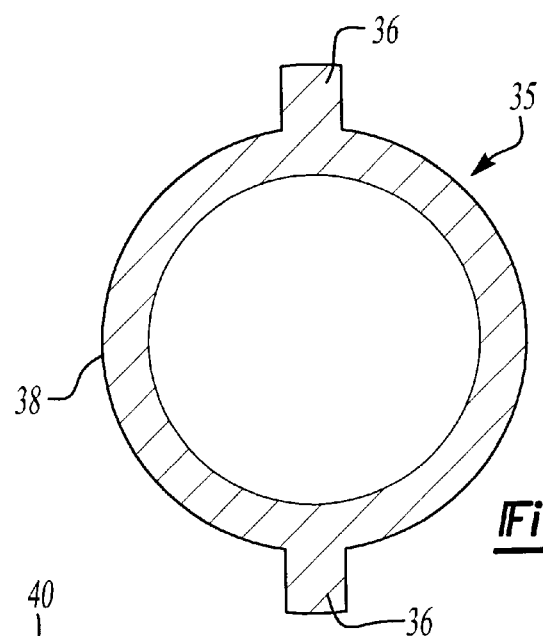
FIG. 4 is a cross-sectional view showing a second embodiment of an extruded tubular member having two integrally formed flanges employed with the preferred embodiment node.

FIGS. 3 and 4 show two embodiments of pre-hydroformed extrusions. An exemplary first extrusion 31, not incorporated within vehicle frame 12, includes an inner surface 32, an outer surface 33 and a flange 34 integrally formed with and radially protruding from the outer surface 33. The single flange or first extrusion 31 is contemplated for use as a header panel with the flange 34 providing a mounting surface for a windshield. FIG. 4 shows a second extrusion 35 including a pair of flanges 36 radially extending from an outer surface 38. The dual flange or second extrusion 35 of FIG. 4 provides mounting locations for other components such as vehicle body panels. It should be appreciated that the outer surface 38 is varied by simply modifying the geometry of the extrusion die (not shown). Accordingly, features such as the mounting flanges 34 and 36 are integrally formed with the tubular member during the extrusion process.

Figure 5:
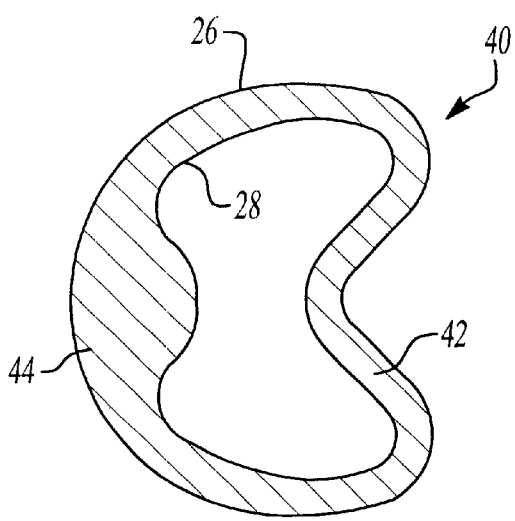
FIG. 5 is a cross-sectional view, taken along line 5—5, showing a third embodiment of an extrusion employed with the preferred embodiment node.

Referring to FIG. 5, the preferred embodiment of the side rail panel 16 is hydroformed from a third extrusion 40 including a generally constant thickness wall portion 42 and a reinforced thicker portion 44. The reinforced wall portion 44 intrudes for approximately 30 to 45 degrees of the inner surface 28 of the side rail panel 16 obtaining a maximum thickness of approximately four milimeters. The generally constant thickness wall portion 42 is preferably one milimeter thick. It should be appreciated that the reinforced portion 44 acts as a sump or well of material when forming the node 12 such that a suitable minimum wall thickness is maintained throughout the finished hydroformed node. Because the reinforced portion is structurally necessary only at node locations, it is advantageous to maintain the generally constant wall thickness portion 42 for the majority of the cross section thereby reducing the overall weight of side rail panel 16. Further weight reduction may be accomplished by selectively removing material located in the reinforced wall portions spaced apart from nodes 12.

Figure 6:
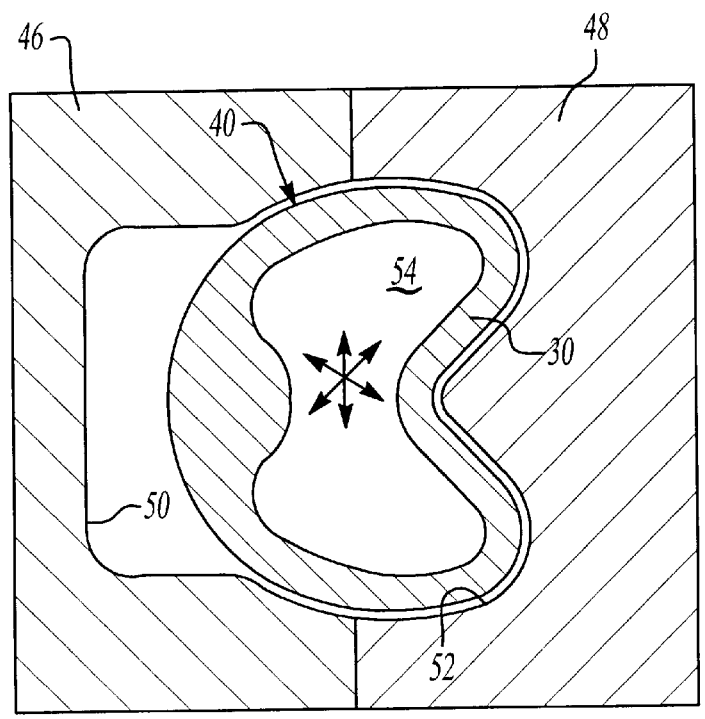
FIG. 6 is a cross-sectional view of a pair of hydroforming dies having the extrusion of FIG. 5 disposed within an internal cavity thereof.
Figure 7:
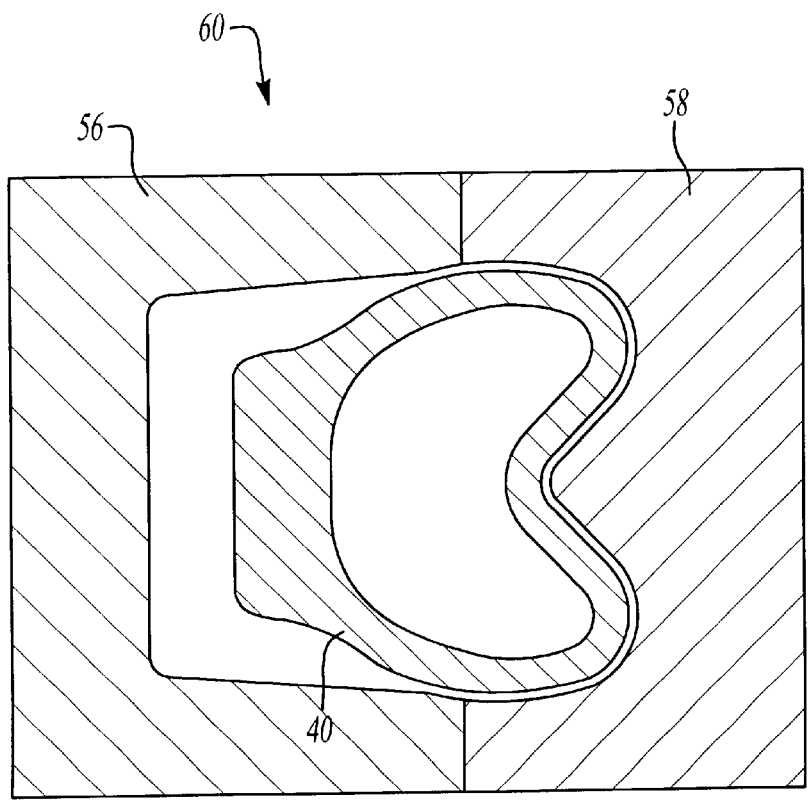
FIG. 7 is a cross-sectional view of a second pair of hydroforming dies having a partially deformed extrusion disposed within an internal cavity thereof.

As mentioned earlier, node 12 of the present invention is integrally formed with side rail panel 16 through the use of internal fluid pressure, preferably by use of a hydroforming process. Hydroforming is essentially the process of deforming a tubular member to a desired complex tubular shape. To this end and with reference to FIG. 6, a tubular member such as extrusion 40 is placed between a first die 46 and a second die 48 having cavities 50 and 52 respectfully, which define the desired resultant shape of the side rail panel 16. First end 22 and second end 24 of the tubular member are accessible through the dies and a seal (not shown) is connected to the ends of the tubular member. Pressurized fluid 54, typically water, is then injected into the ends of the extrusion 40 at a pressure of approximately 100,000 PSI, thereby forcing wall 30 to outwardly expand and conform to the internal shape defined by the die cavities. Depending on the material chosen and the depth of draw required, a number of intermediate hydroforming dies may be required to assure uniform deformation of the side rail panel 16 without rupture. For example, and in reference to FIG. 7, a third die 56 and a fourth die 58 comprise a second hydroforming die set 60 for incrementally deforming the partially hydroformed extrusion 40 into the final desired shape. It should also be appreciated that, as mentioned earlier, the side rail panel 16 may be extruded to include other inner and outer contours prior to hydroforming to structurally enhance the side rail panel 16 and/or ease formation of the node 12.

Figure 8:
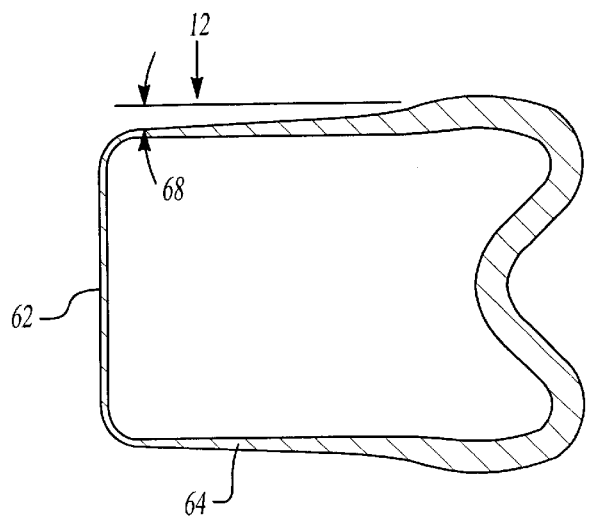
FIG. 8 is a cross-sectional view, taken along line 8—8 of FIG. 2, showing a first member employed with the preferred embodiment node.
Figure 9:
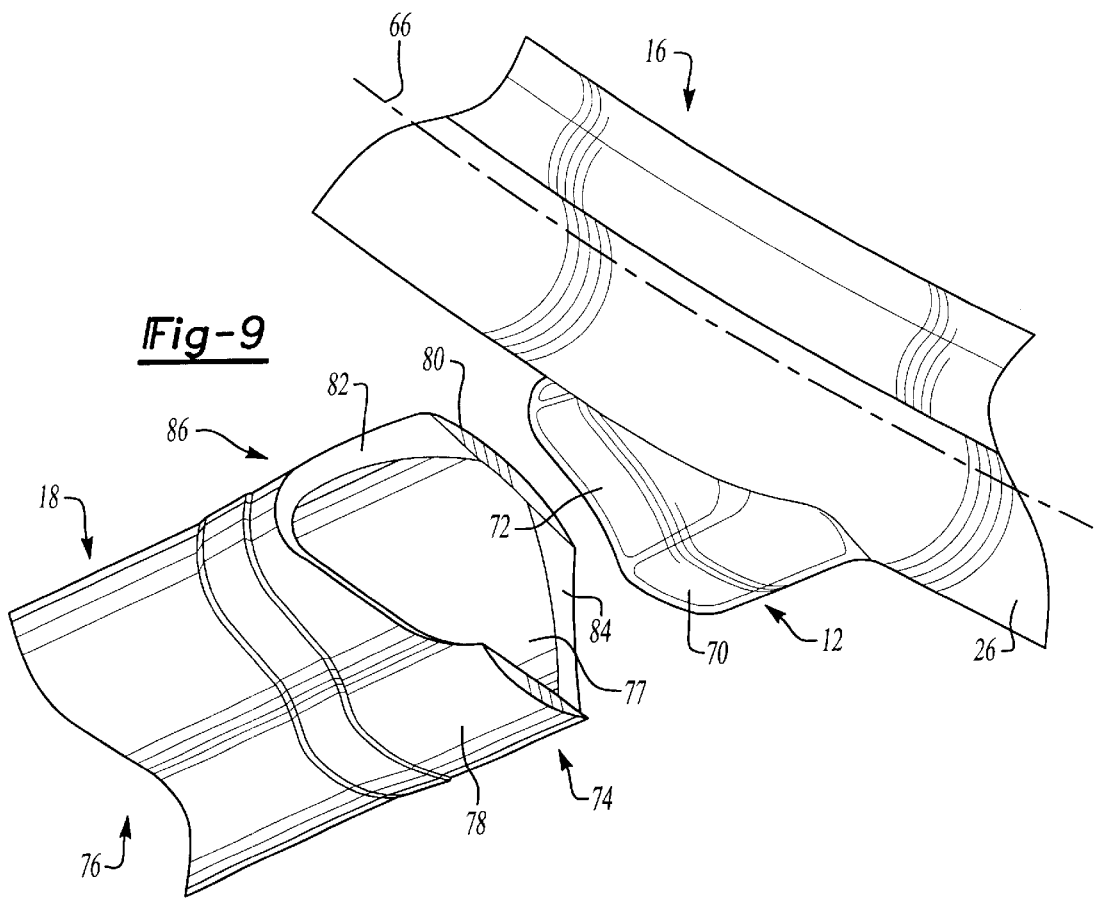
FIG. 9 is a another fragmentary exploded perspective view showing the preferred embodiment of a structural interconnection.

With reference to FIGS. 8 and 9, the completed hydroformed node 12 includes an end wall 62 and a side wall 64 extending substantially orthogonally from a longitudinal axis 66 of the side rail panel 16. Side wall 64 is preferably formed at a small draft angle 68 typically ranging from three to seven degrees to facilitate removal of side rail panel 16 from the dies after hydroforming. Side wall 64 includes a generally convex portion 70, and a generally concave portion 72 to form an asymmetric shape when viewed from the end wall 62. The shape of side wall 64 functions to restrain header panel 18 from rotating once interconnected with node 12. As best shown in FIG. 8, side wall 64 tapers, decreasing in thickness as the side wall approaches the end wall 62 where the section is at a minimum.

Figure 10:
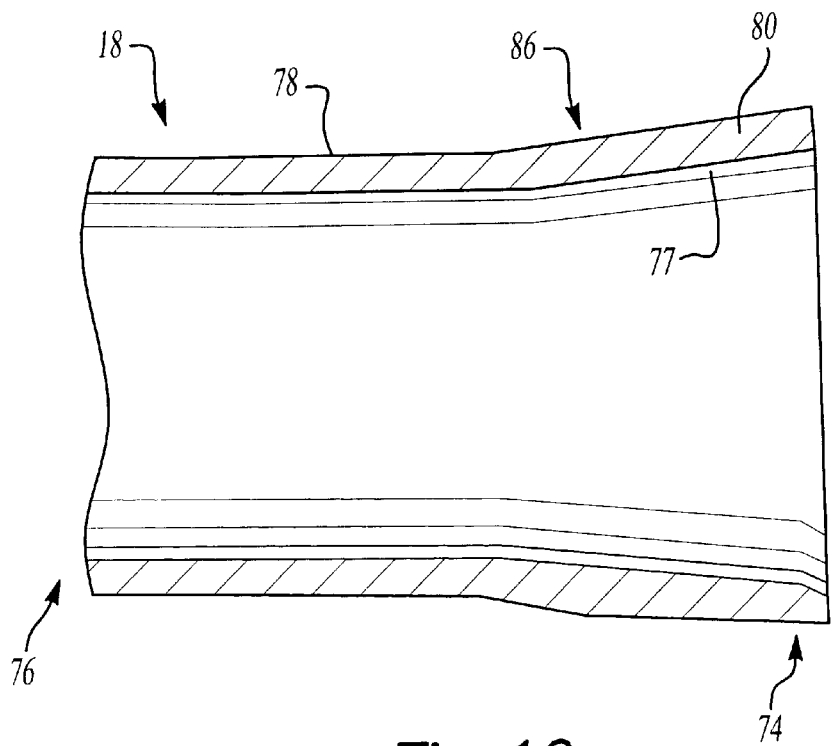
FIG. 10 is a cross-sectional view, taken along line 10—10 of FIG. 2, showing a second member employed with the preferred embodiment node.

With reference to FIGS. 9 and 10, header panel 18 is also a generally cylindrical hollow extrusion having a first open end 74 and a second open end 76. In the preferred embodiment each of the ends 74 and 76 are coupled to a node 12 of the present invention. For clarity, only one such interconnection will be described in detail. Specifically, first open end 74 includes an inner surface 77 and an outer surface 78 defining a wall 80. The wall 80 includes a first recess 82 and a second recess 84 shaped to compliment the outer surface 26 of the side rail panel 16. In addition, the first open end 74 includes a flared or swaged portion 86 for receipt of the hydroformed node 12.

Because the preferred header panel 18 is a tubular member, the flared portion 86 may be created via a hydroforming process as well. In this manner, the flared portion 86 may be accurately formed to provide a slip or interference fit with the hydroformed node 12 as desired. Preferably, the inner surface 77 of the flared portion 86 compliments the draft angle 68 formed by the side wall 64 of the node 12 such that the inner surface 77 is positioned adjacent the side wall 64 at assembly. It should also be appreciated that the tubular header panel 18 is merely exemplary and that a variety of mating components may be utilized including stampings and/or castings. Optimally, the stamping or casting would include a flared portion to compliment the draft angle of the hydroformed node 12.

Figure 11:
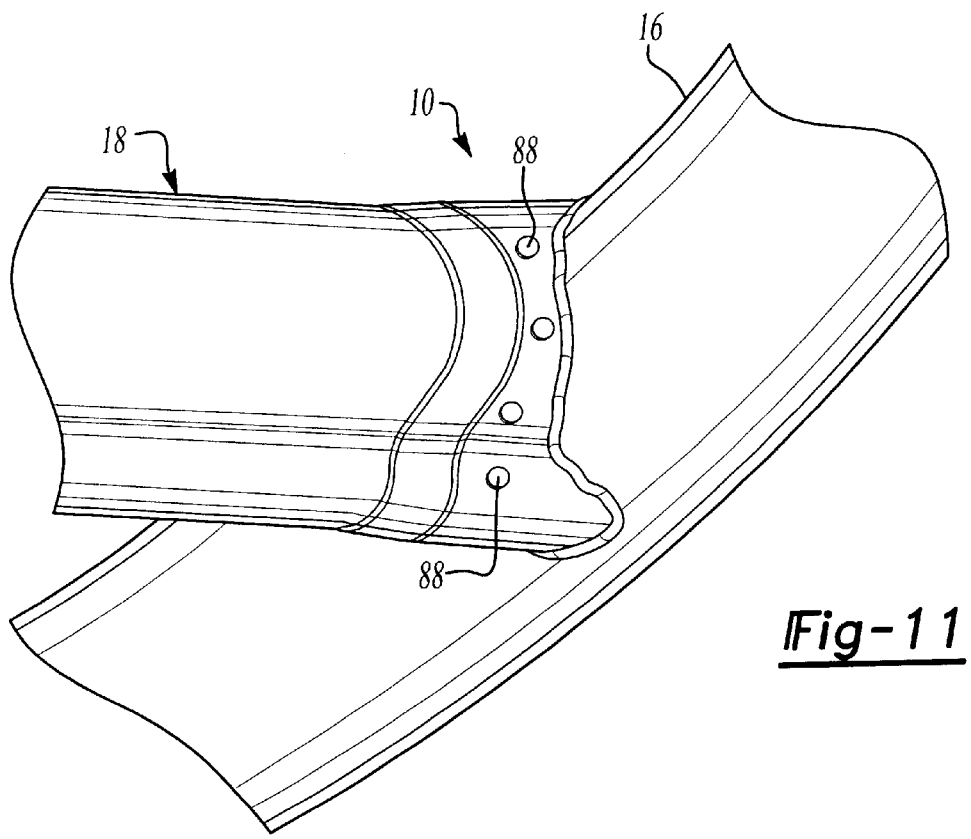
FIG. 11 is a fragmentary perspective view showing the preferred embodiment structural interconnection.

Reference should now be made to FIG. 11 wherein the structural interconnection 10 is completed by engaging node 12 of side rail panel 16 with flared portion 86 of header panel 18. Header panel 18 is mechanically attached to side rail panel 16 to provide further structural benefit. It is envisioned that a variety of attachment methods may be utilized including welding, mechanical fasteners, including rivets or screws, and adhesives. The preferred embodiment incorporates a plurality of rivets 88 extending through apertures (not shown) formed in the flared portion 86 of the header panel 18 and the side wall 64 of the hydroformed node 12. The apertures may be created during the hydroforming process or added subsequently by processes such as drilling, stamping or laser cutting.

Therefore, it should be appreciated that the configuration and operation of the structural interconnection including a hydroformed node provides manufacturing and operational advantages over the prior art. Specifically, the hydroformed node 12 of the present invention provides an integrally formed attachment location economically created through the use of hydroforming.

The foregoing discussion discloses and describes merely exemplary embodiments of the present invention. While various materials have been disclosed, it should be appreciated that a variety of other materials can be employed. It is intended by the following claims to cover these and any other departures from the disclosed embodiments which fall within the true spirit of this invention.

What is claimed:

1. A method of forming a structural interconnection with a die, The structural interconnection including a first member and a second member, the method comprising:

(a) forming the first member to include an internal cavity and a reinforcing section having a thickness greater than the remainder of the first member;

(b) positioning the reinforcing section within a chamber of a die to form a node proximate the reinforcing section;

(c) outwardly pressurizing a fluid within the internal cavity to reduce the thickness of the reinforcing section and thereby forming the node integral with and protruding from the first member; and (d) coupling the second member to the node.

2. The method of claim 1 further comprising forming the node to protrude substantially orthogonally to a longitudinal axis defined by the first member.

3. The method of claim 1 further including the step of placing the first member in a second die and pressurizing the internal cavity prior to the step of coupling the second member to the node.

4. The method of claim 1 wherein the step of coupling the second member to the node includes riveting.

5. A method of forming a structural interconnection with a die, the structural interconnection including a first member and a second member, the method comprising:

(a) extruding the first member to include a reinforcing section having a thickness greater than the remainder of the first member, the first member having an internal cavity;

(b) positioning the reinforcing section within the die to form a node proximate the reinforcing section;

(c) outwardly pressurizing the internal cavity to form the node integral with and protruding from the first member wherein said node includes a sidewall and an end wall, said sidewall protruding substantially orthogonally from a longitudinal axis defined by said first member, wherein said sidewall includes a convexedly shaped portion and a concavedly shaped portion;

(d) positioning the node within an internal cavity of the second member; and (e) coupling the second member to the node.

6. A method of forming a structural interconnection with a die, the structural interconnection including a first member and a second member, the method comprising:

(a) extruding the first member to include a reinforcing section having a thickness greater than the remainder of the first section, the first member having an internal cavity;

(b) positioning the reinforcing section within the die to form a node proximate the reinforcing section;

(c) outwardly pressurizing the internal cavity to form the node to be integral with and protruding from the first member, said node conforming to the shape of said die;

(d) shaping a first end of the second member to conform to an outer surface profile of the node, the second member having an internal cavity;

(e) positioning the node within the internal cavity of the second member; and (f) coupling the first end of the second member to the node.

7. The method of claim 6 further including the step of forming a flange extending radially outwardly from a longitudinal axis of the first member.

8. The method of claim 7 further including the step of forming a second radially extending flange positioned substantially coplanar with said flange.

* * * * *

UNITED STATES PATENT AND TRADEMARK OFFICE
CERTIFICATE OF CORRECTION

PATENT NO. : 6,539,604 B2
DATED : April 1, 2003
INVENTOR(S) : Jeffrey S. Patelczyk It is certified that error appears in the above-identified patent and that said Letters Patent is hereby corrected as shown below:

Column 2,
Line 23, delete "a".
Line 50, delete "panels".
Line 54, delete "panels".

Column 4,
Line 28, "compliment" should be -- complement --.
Line 37, "compliments" should be -- complements --.
Line 44, "compliment" should be -- complement --.

Column 5,
Line 10, "The" should be -- the --.

Signed and Sealed this

Thirtieth Day of September, 2003

JAMES E. ROGAN
*Director of the United States Patent and Trademark Office*